June 10, 1952     M. D. BUIVID ET AL     2,599,690
HELICOPTER CONTROL

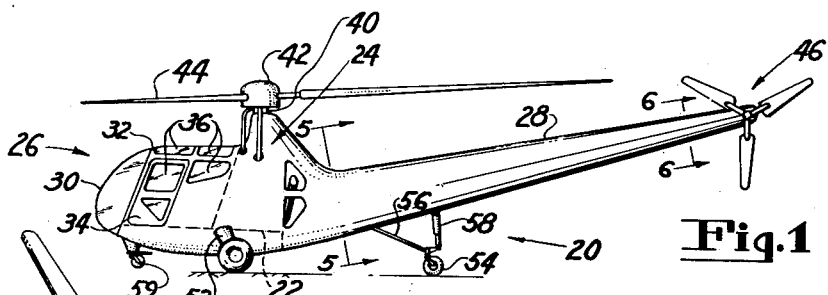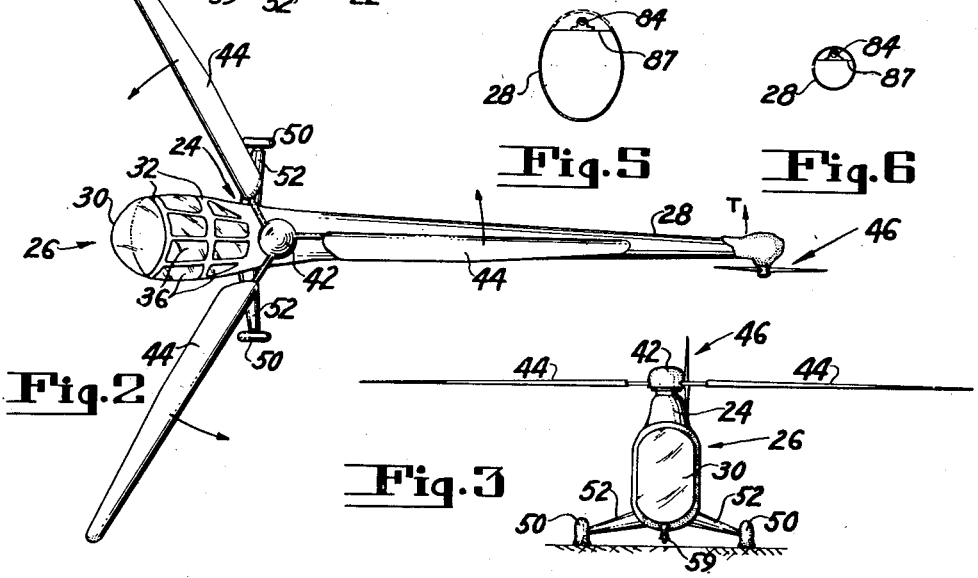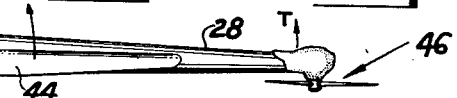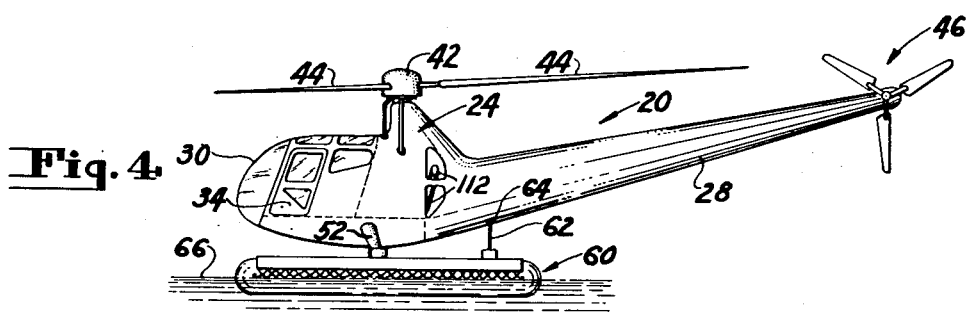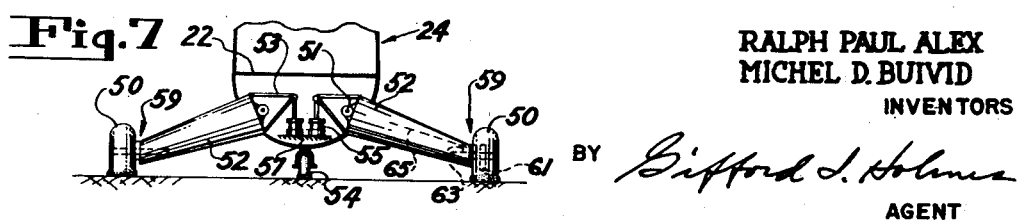

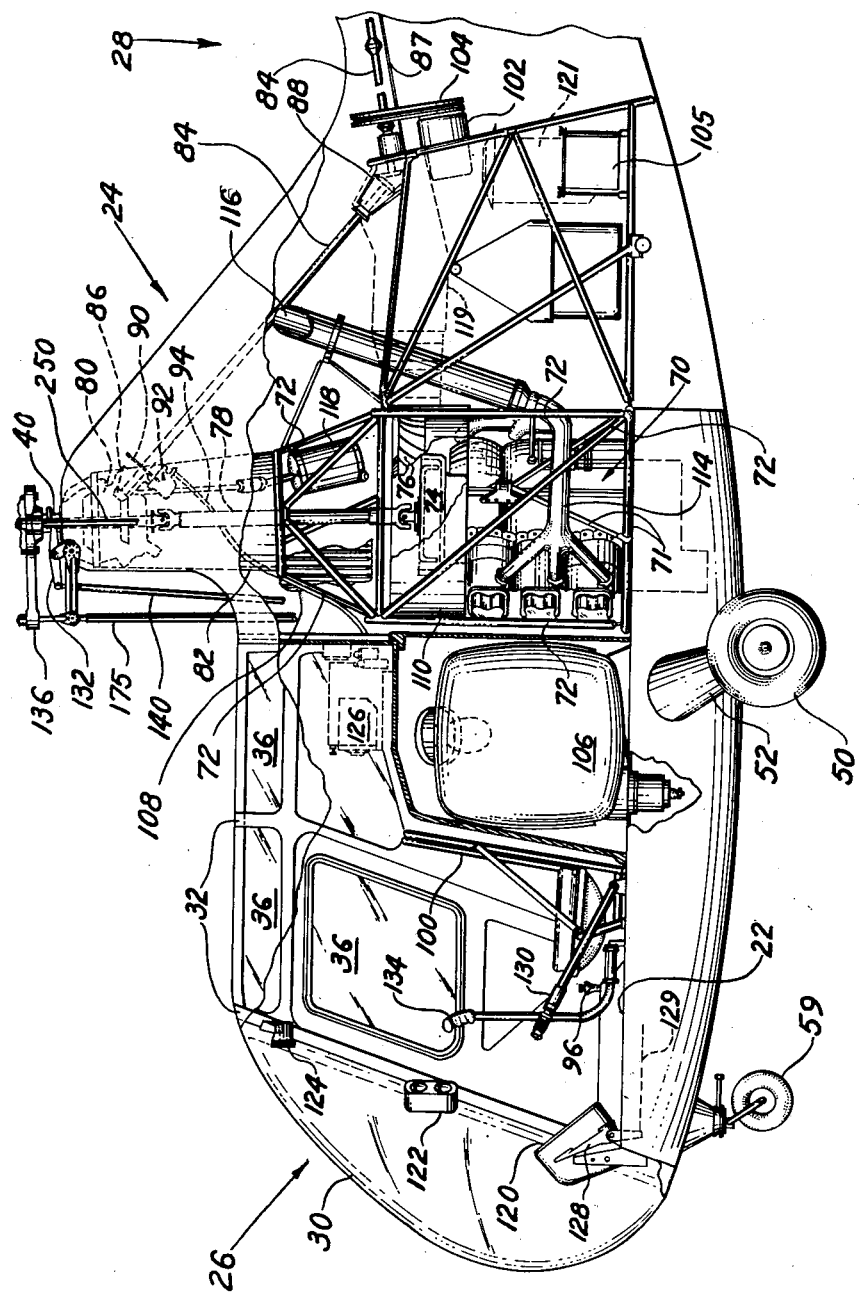

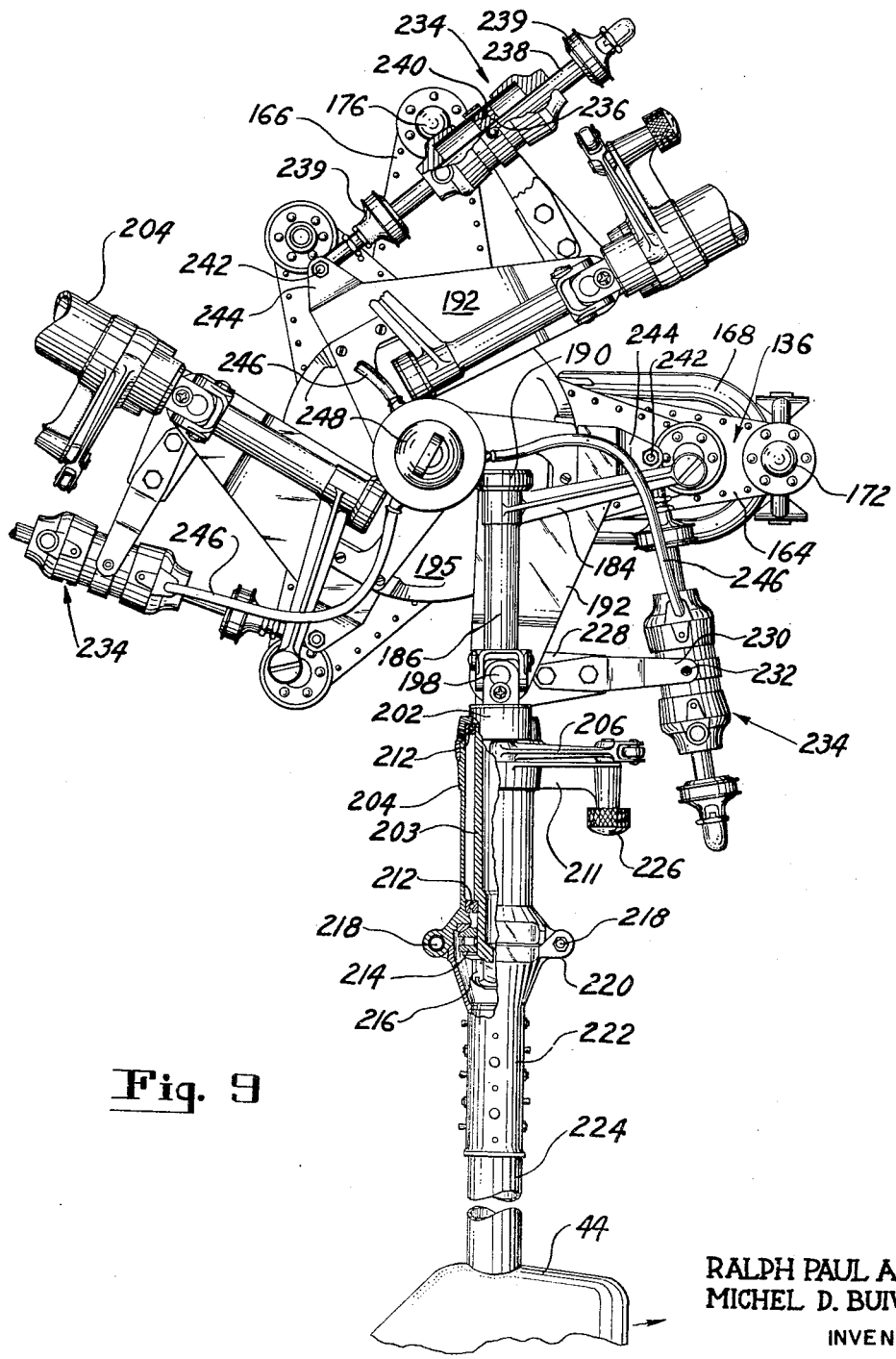

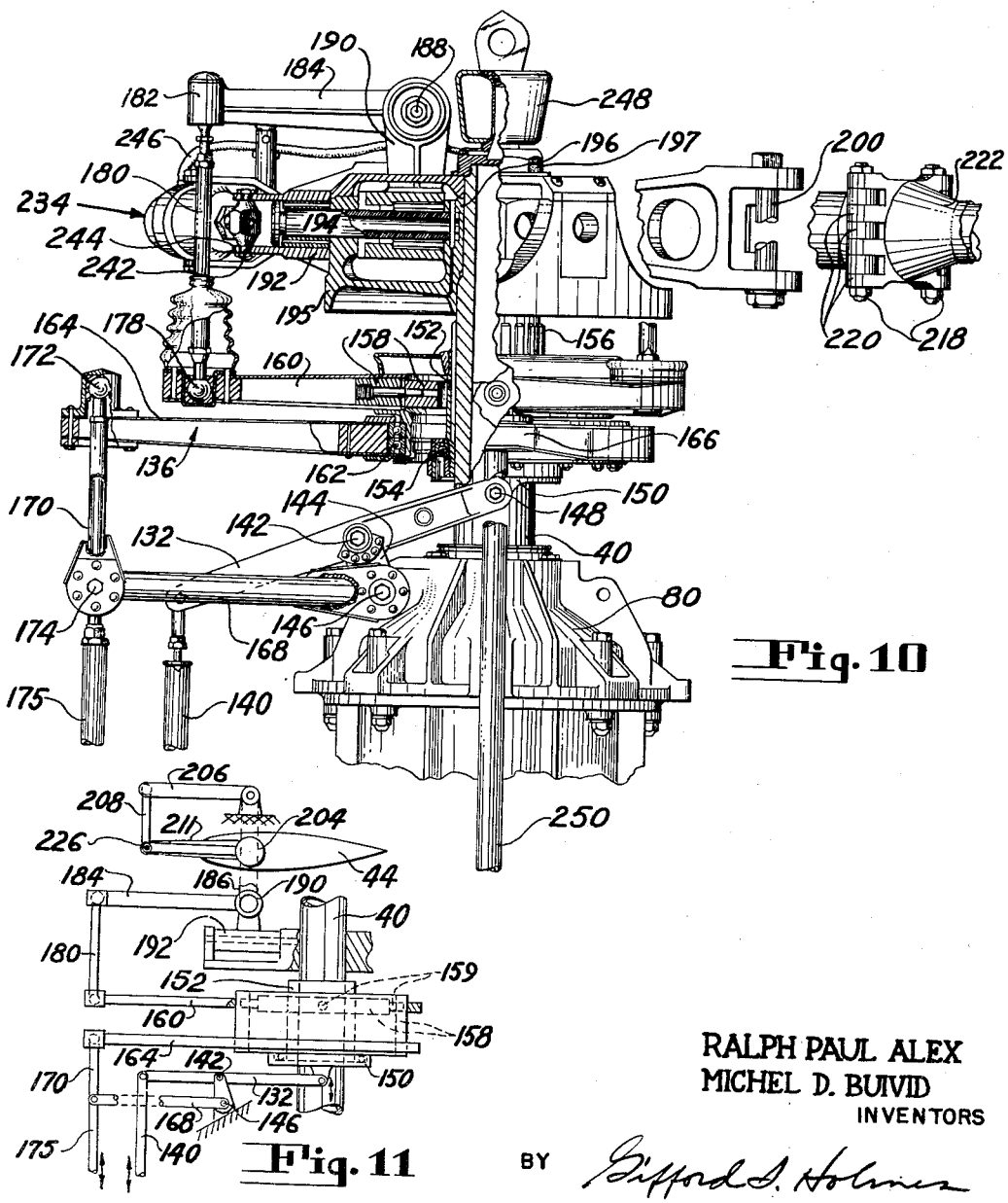

Filed June 16, 1945     5 Sheets-Sheet 5

RALPH PAUL ALEX
MICHEL D. BUIVID
INVENTORS

AGENT

Patented June 10, 1952

2,599,690

UNITED STATES PATENT OFFICE 2,599,690

HELICOPTER CONTROL

Michel D. Buivid, Milford, and Ralph Paul Alex, Stratford, Conn., assignors to United Aircraft Corporation, East Hartford, Conn., a corporation of Delaware Application June 16, 1945, Serial No. 599,920

11 Claims. (Cl. 170—160.25)

This invention relates to aircraft and more particularly to that type of aircraft known as helicopter, and is broadly similar to those shown in patents to Igor I. Sikorsky Nos. 2,318,259, 2,318,260 and 2,517,509.

It is an object of this invention to provide an improved helicopter having a cantilever beam foundation for the body, thereby providing increased visibility in the occupant's portion thereof.

Another object in keeping with the above object resides in providing improved landing gear structure.

A further object resides in providing improved control means incorporating linkages operable with a bodily positionable tilting mechanism mounted below the rotor head.

Another object in keeping with the next preceding object is to provide compensating linkage whereby the cyclic pitch control means will remain unchanged when the total pitch control means is changed.

Another obejct resides in an improved tail rotor support structure incorporated with the drive shaft, and improved generator drive and/or brake means driven with the torque compensation rotor drive shaft.

Other objects and advantages of this invention reside in the details of construction and the improved arrangement of parts for obtaining a compact structure of high capacity to weight ratio, and will either be obvious or pointed out in the following specification, and in the claims.

In the drawings:

Fig. 1 is an elevational view of our improved helicopter shown equipped for operation from land, Fig. 2 is a plan view thereof, and Fig. 3 is a front elevational view thereof.

Fig. 4 is a view similar to Fig. 1, but showing the craft equipped with floats for operation from land or water or other surfaces.

Fig. 5 is a view taken along the line 5—5 of Fig. 1.

Fig. 6 is a view taken along the line 6—6 of Fig. 1.

Fig. 7 is a partial sectional view looking from the front of the craft and showing the arrangement and mounting for the landing gear.

Fig. 8 is a detailed view with parts in elevation and parts in section, with the rotor head removed, and showing the arrangement of parts in the interior of the helicopter.

Figs. 9 and 10 are plan and elevational views of the rotor head, with parts in section.

Fig. 11 is a diagrammatic view of the rotor head;

Figure 13:
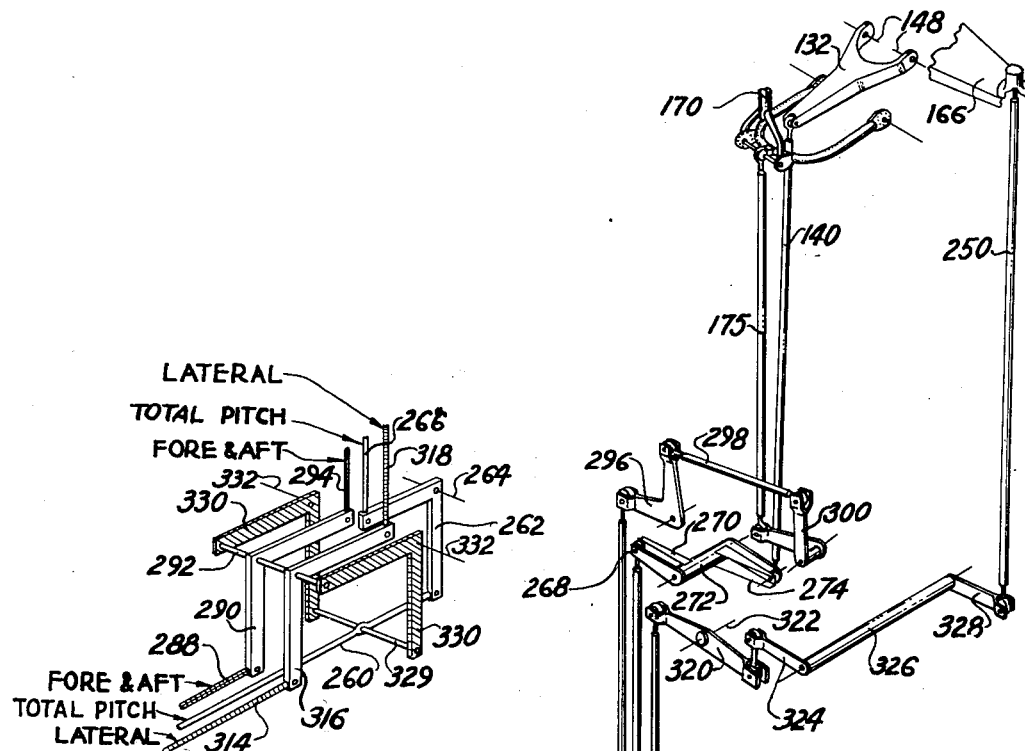
Fig. 13 is a perspective functional diagrammatic view of the compensator linkage of Fig. 12.

In the description of our improved helicopter to follow, certain details of construction pertaining to the presently preferred form will be described. However, it will be understood that equivalents residing within the domain of one skilled in the art are intended to be covered also by the generic concept of that specific embodiment disclosed.

In Fig. 1, a helicopter generally indicated at 20 has a body built around a cantilever floor beam 22 which supports the center portion 24 containing the engine, clutch and associated mechanism to be described more fully hereinafter, and a forward occupant's portion 26, and an empennage portion 28. The occupant's portion 26 is provided with a Plexiglas nose 30 supported by framework 32, which framework also supports a door 34 at each side of the occupant's portion 26. Windows 36 are provided in the framework in the occupant's portion 26 and are located at the top, sides and the bottom of the portion 26 and also in the door 34. Such arrangement of windows provides for an occupant a field of vision substantially in excess of 180° when the occupant is sitting in one of the side by side seats in the cockpit of the occupant's portion 26, which seat arrangement will be described more fully below.

The central portion 24 supports a slightly forwardly tilted drive shaft 40 which turns a rotor head shown in a protective cover 42, which head supports rotor blades 44 movable in a tiltable tip path plane and control linkage to be described more fully hereinafter. The empennage portion, or tail boom, 28 is made of substantially monocoque construction tapering from oval or ovate in shape at the root end adjacent the central portion, Fig. 5, to substantially a round section at its extremity, Fig. 6. A torque compensating tail rotor 46 is carried at the extremity of the boom 28 upon a gear housing as best shown in Fig. 2.

A pair of landing wheels 50 are mounted at the extremities of beams, shown as frustums 52 carried upon pivots 51 in the foundation beam 22, and will be described more fully hereinafter. A tail wheel 54 is mounted upon a movable tripod comprising radius rods 56 and a hydraulic shock strut 58 for absorbing forces upon landing the machine upon the ground or other hard surface. The shock strut 58 may be of conventionally known structure and therefore will not be described in detail. A nose wheel 59 may also be provided.

As best shown in Figs. 2 and 3, the forward position 26 of the helicopter is of bulbous shape of generally oval cross-section with the sides flattened to provide for the doors 34 and to provide forward fin area for the helicopter when in flight. The structure is one which provides light weight for maximum strength and also provides for a large number of windows, as mentioned above, to afford a wide field of vision for an occupant of the forward portion 26. The tail rotor 46 is mounted upon the left side of the fuselage as viewed from the rear looking toward the front of the craft and will exert a thrust in the direction of the arrow having the reference character T. The rotor blades 44 turn in the direction indicated by arrows and will exert a force tending to rotate the boom 28 in the opposite sense. The thrust of the tail rotor 26 can be adjusted by varying the angle of incidence of the tail rotor blades to thus compensate for any required torque of the main rotor, and also provide directional forces for steering the helicopter. The details of construction of the tail rotor 46, and the manual control means therefor, will not be described in detail but may be substantially the same as those shown and described in the above-mentioned patent to Igor I. Sikorsky No. 2,318,259.

That form of our invention shown in Fig. 4 is substantially the same in all respects as that described above except that a pair of floats 60, only one of which is shown in elevation, are arranged at the sides of the central portion 24 of the helicopter 20 and supported upon frustums 52 adjacent their mid points and at rearwardly spaced points by rods 62 carried by brackets 64 upon the sides of the helicopter. The modification shown in Fig. 4 is capable of operating upon land or water. The volume of one of the floats 60 is such that it will displace a sufficient amount of water to provide a righting moment to the helicopter when it alights upon water askew. When both floats displace an equal amount of water, the helicopter will be upright and the water level will be substantially along a half-submerged water line 66 with respect to the floats 60.

In Fig. 7, the wheel-type landing gear is shown partly diagrammatically and partly in section taken across the center portion of the body of the helicopter. The wheels 50 are carried upon axles or trunnions on opposite sides of the body of the helicopter at the extremity of the frustums 52. The frustums are mounted upon pivots 54 and carry arms 53 on the inner sides of the pivots 54. The arms 53 bear upon a plunger of a dash pot 55, which dash pot is mounted upon a frame member 57 secured to the floor beam 22. The wheels 50 are provided with brake mechanism 59 comprising disks 61 secured to the frustums 52. An hydraulic line 65, or a cable, or the like may lead to a lever, not shown, in the cockpit of the helicopter so that the brakes may be applied by the pilot.

Referring now to Fig. 8, the floor beam 22 connects the center portion 24, the forward portion 26 and the rearward portion 28. In the center section 24, an engine 70 is secured to the floor beam 22 by engine mount 71 and extends through holes therein and has operating mechanism to be described hereinafter. The engine 70 drives a centrifugal clutch 74, a blower or fan 76 which circulates air past the engine 70, and also turns a high speed shaft 78 which is connected to a high speed portion of a reduction gear box 80. The gear box 80 is mounted upon a torque tube 82 secured to the structural members 72 at its lower end and to the gear reduction mechanism 80 at its upper end. The tube 82 thus transfers rotor torque through the gear box housing 80 to the framing members 72 which are arranged radially downwardly to resist torsional forces. It will be understood that the tail rotor balances torque forces created in the main rotor and the tail boom 28 provides a long moment arm therefor.

A tail rotor drive shaft 84 is driven from a bevel gear 86 in the gear mechanism 80 and is coupled by a bevel gear 88 to the longitudinally extending portion of the shaft 84 in the tail boom 28 which is supported on a longitudinal partition 87 in the tail boom. A rotor brake mechanism is mounted upon the tail rotor drive shaft 84 and includes a disk 90 connected to the shaft 84 and a hydraulically operated brake shoe 92 secured to the torque tube 82. A hydraulic line 94 is connected with a brake arm 96 in the cockpit adjacent a pilot seat 100, and operation of the handle 96 will cause fluid pressure in the pipe 94 to urge the brake shoe 92 into engagement with the disk 90 so that the drive shaft 40 to the main rotor, and the drive shaft 84 to the tail rotor will have a braking force applied to stop the same and hold them in a stopped condition.

A generator 102 is driven by a coupling 104, shown as belts which operate upon sheaves, so that when the shaft 84 turns the generator 102 will operate to charge a battery 105, which is used in the ignition circuit and also to operate the starter for the engine 70. The ignition and engine electrical hookup do not form a particular part of this invention but may be of any conventional design such as used in aircraft or in automobiles.

The engine 70 is supplied with fuel from a tank 106 which feeds to a conventional carburetor not shown. Cooling air for the engine 70 is drawn through an intake louvre 108 on the upper right hand side of the center part of the craft and the air is drawn down by the fan 76 within a cowling 110 and is exhausted out of a vent 112 on the lower left hand side of the body of the helicopter. Exhaust gas from the engine is led out by an exhaust manifold 114 to an exhaust stack 116 which exhausts at the upper left hand side of the center portion 24 of the helicopter. Oil for the gear mechanism 80 is passed through an oil cooler 118 secured to the framework 72 and located in the cooling airstream for the engine. An engine oil cooler 119 and oil tank 121 are also provided.

In the forward portion 26 of the helicopter the pilot's seat 100 and another similar seat, arranged side by side, are secured to the floor beam 22. The seats 100 are arranged so that an occupant of the same will have wide field of vision through the plastic nose 30 and the windows 36 in the top, sides, and floor. A panel 120 is mounted between these seats in a position where instruments thereon can be readily observed by an occupant of either of the seats 100. Other instruments 122, 124 and a radio 126 are also mounted in the forward portion 26 in convenient locations for use by an occupant thereof. Pairs of pedals 128 are connected upon pivots in the floor beam 22 and connect with cables 129 to the tail rotor pitch control means. For details of this structure, reference may be had to the above mentioned patents and application.

A total pitch control arm 130 connects through linkage to be described below to a total pitch positioning link 132 to change the pitch of all the rotor blades 44 simultaneously. The total pitch control arm 130 is located between the seats 100 so that an occupant of either seat may control the lift of the helicopter. A pair of joy sticks 134 connect through linkage to be described hereinafter to a tilt plate 136 for controlling translational movements of the helicopter.

In Figs. 9 and 10 the rotor head connections and assembly are shown. Inasmuch as each of the rotor blades is identical to each of the others, the parts forming only one will be described in detail. It will be understood, however, that more or less than three rotor blades can be used in this helicopter without departing from the spirit of the invention, or without operating in a different manner because each rotor blade functions the same as each other and the number of blades is a matter of designer's choice. The control linkage can be substantially the same.

The total pitch link 132 is connected at its outermost end with a push-pull rod 140. A pivot 142 connects with a point between the ends of the link 132 and with a link 144 pivoted upon a pin 146 which is secured to the gear reduction housing 80. The innermost end of the link 132 is formed as a yoke having a pair of pins 148 arranged upon opposite sides of the drive shaft 40 and pivotally secured to ears on a ring 150. The ring 150 is held non-rotatably by the link 132 but is moved up and down along the axis of the shaft 40 when the push-pull rod 140 is moved up or down. An internal sleeve 152 is secured to the ring 150 by ball bearings 154 so that as the ring 150 is moved up and down the sleeve 152 will be moved thereby. The sleeve 152 is carried by splines 156 on the outside of the shaft 40 so that the sleeve 152 will rotate with the shaft 40 and the ball bearings 154 will offer very little restraint to such rotation. The sleeve 152 carries inner and outer gimbal rings 158 mounted on pivots 159 (Fig. 11) which form a universal connection to permit a tilt plate 160 to tip into any angle in azimuth with respect to the shaft 40 while being rotatable with said shaft. The tilt plate 160 is connected by ball bearings 162 to the non-rotatable tilt member 136 which comprises a pair of arms 164 and 166 arranged in 90° relationship to each other, see Fig. 9. The tilt member 136 is held by arm 164 non-rotatably by a yoke 168 carried upon the pivot 146 secured to the housing 80, and a Y-shaped push-pull link 170 secured to a ball joint 172 at its upper end to the arm 164 and upon a substantially horizontal pivot 174 connected to the yoke 168 and a push-pull rod 175 connected to the fore and aft portion of the azimuthal control mechanism. With this structure, the arm 164 can be moved up and down by the push-pull rod 175, and the arm 164 can tilt freely about the ball joint 172. The lateral control is connected to a push-pull rod 250 by a ball joint 176 to the arm 166 to move that arm up and down and to permit tilting also.

The movement up and down of the end of arm 164 will control fore and aft tilting of the tip path plane of the rotor blades 44 to control forward and backward movements of the helicopter. Movement up and down of the end of arm 166 will control lateral movements of the helicopter. Inasmuch as each function is the same as the other, except for direction, only the fore and aft action and the connections to a single rotor blade will be described.

The arm 160, Fig. 10, connects with a ball joint 178 to a push-pull rod 180 connected by a ball joint 182 at its upper end and to a rocker arm 184. The rocker arm 184 is secured to a torque shaft or rod 186 (Fig. 9) mounted in a pivot 188 to a bracket 190 carried by a flapping link 192. The flapping link 192 is mounted upon a horizontal pivot 194 secured to a hub 195 carried by the drive shaft 40 upon splines 196 and held by a combination lock nut and hoisting fitting 197. The flapping link 192 can rotate around the pivot 194, in a flapping range between stops, not shown. The torque shaft 186 is provided with a universal joint 198 which has a center of rotation in vertical alignment with a drag pin 200, Fig. 10, so that as the blade 44 moves back and forth with respect to the flapping link 192, the center of rotation of the universal 198 will remain in registry with the transient center of rotation of the blade 44 upon the drag pin 200. The shaft 186 is connected through the universal 198 and the bearing 202 secured to a stub spar 203 and to a rocker arm 206. The rocker arm 206 is pivotally connected with a link 208 to an arm 210 secured through a pin 226 and an arm 211 to cuff 204, Figs. 10 and 11, so that as the arm 206 is rotated the link 208 will be moved up or down and rotate the cuff 204 to change the angle of incidence of the blade 44. The cuff 204 is mounted upon bearings 212 upon the stub shaft 203 which carries radial thrust bearings 214 by means of a lock nut 216 for maintaining the axis of the blade 44 in alignment with the stub spar 203 and for assuming centrifugal forces. The cuff 204 is connected by pins 218 in mating ears 220 of a sleeve 222 mounting a spar 224 of the blade 44. One or the other of the pins 218 can be removed, and the linkage described above can be disconnected by means of the latching pin 226 so that the blade 44 may be folded back against the side of the fuselage of the helicopter for the purposes of storing or transporting the same. The details of the construction of the latch 226 may be substantially the same as that shown in the co-pending application of Michel D. Buivid, Serial No. 481,254, issued as Patent No. 2,405,777, August 13, 1946.

The stub spar is provided with an angularly disposed arm 228 to which a yoke 230 is attached. The arm 228 and the yoke 230 will rotate around the drag pin 200 together. The yoke 230 is provided with a pair of upper and lower pins 232 which retain a cylinder 234. The cylinder 234 contains a piston 236 carried upon a piston rod 238. The piston 236 has an orifice 240 passing a liquid such as oil from one of the chambers defined by the piston 236 and the walls of the cylinder 234 to the other. The cylinder 234 can move upon the rod between hunting stops and shock absorbers 239. The rod 238 is connected to a pivot 242 in a pair of ears 244 formed as extensions of the flapping link 192. Thus, for hunting movements of the rotor blade 44 around the drag pin 200, the damper mechanism will resist such motions by the characteristics of fluid flow through the orifice 240. The chambers of the damper mechanism communicate by tubes 246 with a reservoir 248 carried at the uppermost end of the drive shaft 40. The reservoir 248 will maintain the chambers of the dampers full at all times to insure proper operating thereof. Further details of the damper mechanism are shown in co-pending application of Michel D.

Buivid, Serial No. 481,254, issued August 13, 1946 as Patent No. 2,405,777.

In Fig. 11 the several parts described above are shown diagrammatically for the purpose of clearly showing the operation for total and cyclic pitch changes. When the total pitch push-pull rod 140 is moved upwardly, the link 132 will be rocked around its pivot 142 to pull the ring 150 and the gimbal rings 158 downwardly so that the plate 160 will also move downwardly. Such movement will pull the link 180 downwardly to rock the arm 184 in a counterclockwise direction. This will rotate the shaft 186 and the arm 206 in the same direction to move the link 208 downwardly and rock the arm 211 and the cuff 204 in a direction to decrease the angle of incidence of a blade 44. Thus, an upward movement of the rod 140 will reduce the pitch of the blade 44. Downward movement of the rod 140 will increase the pitch of the blade 44.

When the fore and aft tilt rod 175 is moved upwardly, the link 170 will be moved upwardly to tilt the arm 164 around the pivots 159 for the gimbal rings 158. Such movement will cause the rod 180 to move upwardly which will rotate the arms 184, 206 and 210 in a clockwise direction to increase the pitch of the rotor blade 44. As the rod 175 is moved downwardly, the pitch of the blade 44 will be reduced. This increase and decrease of pitch under the influence of the cyclic pitch control rod 175 will occur once in each revolution of the rotor shaft 40 because the rod 175 maintains the inclination of the stationary tilt mechanism 136 while the plate 160 and linkage connected therewith to the rotor blade rotate with the shaft 40.

Figure 12:
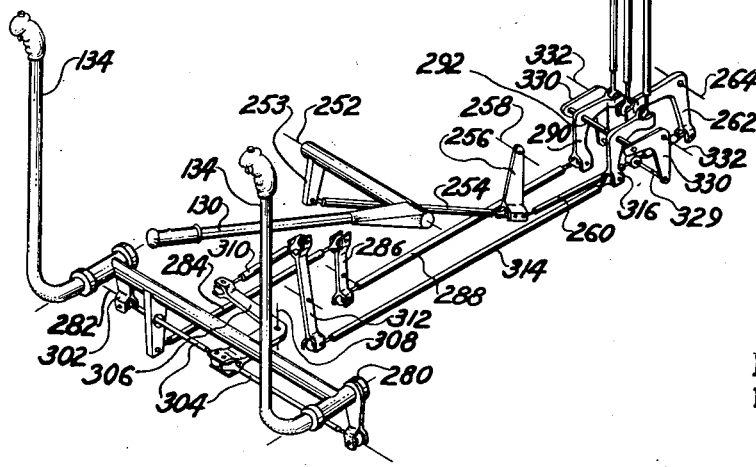
Fig. 12 is a perspective diagrammatic view of the control linkage.

In Fig. 12, the control linkage for moving the total pitch arm 140 and the fore and aft control rod 175 and a lateral control rod 250 is shown. The total pitch control arm 130 is mounted upon a pivot 252 and moves the rod 254 back and forth. The rod 254 is connected to a link 256 pivoted at 258 to brackets on the floor beam. A push-pull rod 260 is connected with the link 256 and is moved back and forth when the arm 130 is rotated up and down. A bell crank 262 is mounted upon a fixed pivot 264 so that back and forth movement of the rod 260 will cause a rod 266 to be moved up and down. The rod 266 is pivoted at 268 to an arm 270 carried upon a torque tube 272. An arm 274 is carried by the other end of tube 272 and is connected with the rod 140 which, in turn, connects with the link 132 for changing the total pitch of the rotor blades 44. As the manual control arm 130 is pulled upwardly, the rod 260 will be pulled toward the left as viewed in Figs. 12 and 13 to raise the rod 266 which will lower the rod 140 because of the action of reverse motion levers 270 and 274, which will push up the pivots 148 to increase the angle of incidence of the rotor blades 44 in the manner pointed out above in connection with Fig. 11. Pushing the arm 130 downwardly will reduce the pitch of the rotor blades 44.

The joy stick 134 is mounted in a lateral pivot 280 which, in turn, is carried in a fore and aft pivot 282. Fore and aft movement of the joy stick 134 will cause the stick to rotate around the pivot 282 to move a link 284 back and forth. The link 284 connects with a centrally pivoted link 286 to move a link 288 back and forth. The link 288 connects with a bell crank 290 upon a pivot 292, which pivot may be moved as described below. The other arm of the bell crank 290 connects with a rod 294 that is, in turn, connected to one arm of the bell crank 296. The other arm of the bell crank 296 connects with a rod 298 which connects with one arm of a bell crank 300. The other arm of the bell crank 300 is, in turn, connected with push-pull rod 175 for moving the link 170 connected to the arm 164 of the tilt mechanism described above in connection with Figs. 9, 10, and 11.

Lateral movement of the joy stick 134 will cause it to pivot around the pivot 280 to rock an arm 302 connected with a rod 304 that connects to one arm of the bell crank 306, mounted upon a vertical pivot 308. The other arm of the bell crank 306 connects with a link 310 to rock a centrally pivoted lever 312. The lever 312 connects with a rod 314 at one end, which rod connects with a bell crank 316 at its other end. The bell crank 316 is mounted upon the movable pivot 292. The other arm of the bell crank 316 connects with a rod 318 which, in turn, connects with one end of a lever 320 carried upon a pivot 322. The other end of the lever 320 connects to an arm 324 which rotates a shaft 326. The shaft 326 is spaced to the side of the center portion of the fuselage 24 so that an arm 250 connected to an arm 328 turned by the rod 326, can control the position of the lateral arm 166 of the tilt mechanism.

When the joy stick 134 is pushed forwardly, the rod 284 will move backwardly to rock the link 286 and pull the rod 288 forwardly. The bell crank 290 will be rocked in a clockwise direction to pull the rod 294 downwardly. The bell cranks 296 and 300 will be rocked in a counterclockwise direction to pull down the rod 175. Thus, forward motion of the joy stick 134 will pull down the tilt mechanism toward the forward part of the tilt mechanism, and, therefore, raise the tilt mechanism at its rearmost portion. Hence, the rotor blade will be at low pitch when it is advancing toward the forward position and 90° away from longitudinal alignment with the axis of the helicopter, see Fig. 9. The control applied to a rotor blade leads the position of the blade by substantially 90°. Hence, as a blade is advancing from adjacent the tail of the helicopter to a position over the nose of the helicopter, the angle of incidence of the blade will be at a low value with a mimum when the blade is 90° to the right of the body of the helicopter, assuming counterclockwise rotation of the rotor blades as viewed from above. As the blade retreats from the nose of the craft to the tail of the craft, the angle of incidence thereof will be the greatest at a point 90° to the left of the body.

When the joy stick 134 is pulled backwardly, the opposite tilt of the tilt mechanism than that described above will obtain, and the minimum angle of incidence of the blade will occur as the blade moves from the nose of the craft to the tail of the craft. Inasmuch as the blade will rise when it has an increased angle of incidence, the tip path plane of the rotor blades 44 will be inclined upwardly 90° following the application of increased pitch (see Igor I. Sikorsky, Patent No. 2,517,509). Thus, for forward motion of the joy stick 134, the tip path plane of the rotor blades will be up adjacent the tail of the craft, and downward adjacent the nose of the craft to accelerate the craft in a forward direction. For rearward motion, the tip path plane will be up at the front and down at the rear. Sideways movement of the joy stick 134 will cause the lateral control arm 250 to be moved up or down to cause the ship to move toward the right or left.

A compensating linkage is provided in the control linkage described above so that changes in total pitch and cyclic pitch will not affect each other. The total pitch change rod 260 is connected by a cross rod 329 to a pair of bell cranks 330. The bell cranks 330 are carried by fixed pivots 332 so that when the total pitch rod 266 is raised the movable pivot 292 for bell cranks 290 and 316 of the cyclic pitch central linkage will be raised simultoneously and the fore and aft and lateral control rods 294 and 318 will also be raised. During such raising action the rods 288 and 314 will pivot around their connections to the bell cranks and to the levers 286 and 312 respectively. These pivot points are spaced from the bell cranks 290 and 316 so that the angular movement of the rods 288 and 314 will have no appreciable longitudinal component of movement with respect to the connection points with said bell cranks. Thus, when the rod 266 is raised, the rods 294 and 318 will be raised the same distance and the fore and aft and lateral control of the helicopter will not have its condition changed but these rods will control at a new set point as determined by the position of the total pitch bell crank 262. This arrangement also provides that fore and aft and lateral control affected by moving bell cranks 290 and 316 will not change the total pitch setting.

Operation

The helicopter described above will operate in substantially the same way as that helicopter shown in the patent of Igor I. Sikorsky, No. 2,517,509, mentioned above. The helicopter described herein, however, has less fuselage drag than the helicopter of said application and the promptness of response of the machine to a given change in directional control, for example, will exceed that of the helicopter disclosed in said application. The pendulum period of the two may be substantially the same depending upon the geometry of the crafts and the relationship of the center of gravity to the center of suspension, which latter position is substantially in registry with the drive shaft 40 and at the geometric center of the rotor system. Thus, the present description of operation will not be in such detail as in the above mentioned application, and for further details of operation reference should be had thereto.

When it is desired to raise the helicopter from the ground, the total pitch control arm 130 is raised. Such action will cause the angle of incidence of the rotor blades 44 to be increased to thus increase the power absorbed by the rotor to cause it to sustain the craft in the air and accelerate it upwardly away from the supporting surface. Inasmuch as increased pitch of the blades will require greater torque, the pedestal 128 may be operated to increase the pitch of the tail rotor 46 to maintain the craft in a given heading.

To cause the craft to move forward in the air, the joy stick 134 is pushed forwardly to cause the tilt mechanism to tilt down at its front portion to cause the tip path plane of the rotor blades 44 to tilt downwardly at the forward part of the craft and upwardly at the rearward part of the craft. Such tilting of the tip path plane will cause a forward component of thrust of the main rotor to be exerted to accelerate the helicopter in the forward direction. As forward speed relative to the sustaining air is obtained, the relative wind will cause the advancing blades to obtain a greater lift for a given angle of attack than when operating in still air. Thus, to maintain a forward velocity, it may be necessary to maintain the joy stick 134 in a forward position. In operation, the joy stick will stand in a direction substantially perpendicular to the tip path plane. Thus, to maintain a given forward velocity, it is necessary, in most cases, to maintain the joy stick 134 tilted with respect to the earth.

To cause the helicopter to move laterally, or to bank in forward flight, the joy stick 134 may be moved to the right or to the left which will cause the tip path plane of the rotor blades 44 to assume a position substantially perpendicular to the vertical axis of the joy stick 134 and cause the helicopter to move in the direction of movement of the joy stick 134.

When forward speed is obtained, within a given speed range, the total pitch arm 130 may be lowered to reduce the angle of incidence of the rotor blades 44. Thus, they will operate with the advantage of relatively moving air and the consequent increase in the mass of air passed through the rotor to decrease the power required thereby. When decelerating, the total pitch arm 130 will be pulled up because the air meeting the rotor will be slowed down and more power will need to be supplied from the engine to the rotor. The throttle for the engine 70 is synchronized with the total pitch arm and connected thereto, so that for increased pitch, the throttle will be opened, and vice versa, as shown in the above patents.

Upon initially accelerating this helicopter, the tip path plane of the rotor blades will be inclined downwardly in front and upwardly in rear, as described above. Such tilting will cause a horizontal component of thrust to move the rotor through the air. The fuselage, at this time, will be swung backwardly in the same manner as a pendulum as the point of suspension is moved forwardly. The period of oscillation of the body of the helicopter is determined by its natural period as a pendulum plus the damping due to the medium in which it operates, i. e. air. Inasmuch as the fuselage of this craft is well streamlined, the damping will be of low order at low speeds and the modification of control due to fuselage tilting will be more affected by the pendulosity of the craft than by the aerodynamic drag of the fuselage. At high speeds, the damping will increase, and may exceed the pendulum effect.

When the craft is in forward flight, the tip path plane of ths rotor blades 44 will be inclined with respect to the earth as pointed out above. In a steady state the fuselage drag will cause a swinging back of the fuselage to an extent determined by the streamlining and geometry of the craft. This drag will cause the tilt mechanism to be slightly tilted in space when the craft is in level flight. To augment and assist the craft in flying at an even keel, the drive shaft 40 supporting the rotor is inclined slightly forwardly as best shown in Figs. 1 and 4. Hence, due to the streamline structure and the built-in tilt of the main rotor, this helicopter will fly forwardly on substantially an even keel.

While we have shown and described in some detail a preferred embodiment of our invention, it will be obvious that mechanical equivalents can be used in many places for accomplishing the same result. For instance, while we have shown rods and levers, it would be obvious to use cables and pulleys. It would also be an obvious step to streamline different parts more or less than shown to obtain the desired flight characteristics or craft which are desired to operate at different maximum or cruising speeds. For these reasons, we wish not to be limited in our invention only to that form shown and described but by the scope of the following claims.

We claim:

1. In aircraft of the character described, in combination, a rotor drive shaft rotatable about its longitudinal axis, variable pitch rotor blades driven by said shaft, means axially movable and tiltable relative to the axis of said shaft or controlling the pitch of said blades, manual means connected with said control means, said manual means including linkage forming total pitch control means for adjusting the pitch of all blades simultaneously and cyclic pitch control means for all blades for sinusoidally varying the pitch of each blade during each revolution of the rotor, and means for compensating the cyclic pitch control means and the total pitch control means upon positioning one with respect to the other in all tilted positions of said tiltable means including, a first bell crank means connected with the total pitch control means in the linkage connecting said total pitch control means to said tiltable meas for moving the latter axially, and second bell crank means connected with said total pitch control means and also moved upon movement of said total pitch control means for moving elements of said cyclic pitch control means in a corresponding direction so that the cyclic pitch of said blades will not be substantially varied upon total pitch changes.

2. In aircraft of the character described, in combination, a rotor drive shaft rotatable about its longitudinal axis, variable pitch rotor blades driven by said shaft, means axially movable and tiltable relative to the axis of said shaft for controlling the pitch of said blades, manual means connected with said control means, said manual means including linkage forming total pitch control means for adjusting the pitch of all blades simultaneously and cyclic pitch control means for all blades for sinusoidally varying the pitch of each blade once in each revolution of the rotor, and means for compensating the cyclic control means and the total pitch control means, upon positioning one with respect to the other in all tilted positions of said tiltable means including, bell crank means connected with the total pitch control means and with said cyclic pitch control means for moving elements of said cyclic pitch control means in a corresponding direction upon movement of said total pitch control means so that the cyclic pitch of said blades will not be substantially varied upon total pitch changes.

3. In rotary wing aircraft having a sustaining rotor with a plurality of blades and means for altering the pitch of the blades comprising a non-rotatable pitch control ring vertically displaceable to alter aggregate pitch and tiltable to introduce cyclic changes of pitch; the combination therewith of an aggregate pitch control member connected to the ring to control the average height thereof, two cyclic pitch control members, a first combining mechanism having (a) a first input means connected to and movable by said aggregate pitch control member, (b) a second input means connected to and movable by the first of said two cyclic pitch control members, and (c) an output means movable jointly by said two input means and connected to a first point fixed to said ring to vertically position said point; and a second combining mechanism having (a) a first input means connected to and movable by said aggregate pitch control member, (b) a second input means connected to and movable by the second of said two cyclic pitch control members, and (c) an output means movable jointly by said two last mentioned input means and connected to a second point fixed to said ring to vertically position said second point.

4. In a rotary wing aircraft, a drive shaft rotatable about its longitudinal axis, a rotor driven by said shaft having variable pitch blades, mechanism for varying the pitch of said blades, a member axially movable and tiltable relative to said shaft having operative connections to said pitch varying mechanism, a first manual means for moving said member axially of said shaft to change the pitch of said blades collectively including a first pilot's control lever and linkage means connecting said lever to said member, a second manual means for tilting said member to change the pitch of said blade cyclically including a second pilot's control lever and a second linkage means connecting the latter to said member, said second linkage means including a first pivoted member pivoted intermediate its ends having one of its ends connected to said axially movable and tiltable member and its other end connected to said second control lever, and compensating means interposed between said first and second linkage means for maintaining the tilted position of said tiltable member unchanged during axial movement thereof including a second pivoted member pivoted intermediate its ends on a fixed part of said aircraft having one of its ends operatively connected with said first linkage and having its other end operatively connected to said first pivoted member for bodily displacing the latter in response to movements of said first manual means.

5. In a rotary wing aircraft, a drive shaft rotatable about its longitudinal axis, a rotor driven by said shaft having variable pitch blades, mechanism for varying the pitch of said blades, swashplate mechanism axially movable and tiltable relative to said shaft, means operatively connecting said swashplate mechanism to said pitch varying mechanism for varying said blade pitch collectively upon movement of said swashplate mechanism axially of said shaft and for varying said blade pitch cyclically upon rotation of said rotor with said swashplate mechanism tilted relative to said shaft, a first manual means for moving said swashplate mechanism axially of said shaft to change the pitch of said blades collectively including a first pilot's control lever and linkage means connecting said lever and said swashplate mechanism, a second manual means for tilting said swashplate mechanism to change the pitch of said blade cyclically including a second pilot's control lever and a second linkage means connecting said second control lever and said swashplate mechanism, said second linkage means including an adjustably mounted bell crank having one arm connected to said swashplate mechanism and another arm connected to said second control lever, and motion compensating means interposed between said first linkage means and said second linkage means for maintaining the tilted position of said swashplate mechanism unchanged during axial movement of the latter including a bell crank pivoted on a part fixed to said aircraft having one arm operatively connected to said first linkage and another arm forming the pivotal support for said adjustably mounted bell crank.

6. In a rotary wing aircraft, a drive shaft rotatable about its longitudinal axis, a rotor driven by said shaft having variable pitch blades, mechanism for varying the pitch of said blades, swashplate means axially movable and tiltable relative to the axis of said shaft, linkage means pivotally connecting said swashplate means with said pitch varying mechanism for varying the pitch of said blades collectively upon axial movement of said swashplate means and for varying the pitch of said blades cyclically upon rotation of said rotor with said swashplate means tilted, manually operable means for moving said swashplate means axially to vary the pitch of said blades collectively including a collective pitch control lever and linkage for connecting the latter to said swashplate means, manually operable means for tilting said swashplate means to vary the pitch of said blades cyclically including a cyclic pitch control lever and linkage for connecting said cyclic pitch control lever to said swashplate means, and means interconnecting said linkages and operated upon the operation of said collective pitch control lever in any position of said swashplate means for moving elements of said cyclic pitch control linkage a distance equal to the axial movement of the swashplate means resulting from collective pitch control displacement thereof.

7. In a rotary wing aircraft, a drive shaft rotatable about its longitudinal axis, a rotor driven by said shaft having variable pitch blades, mechanism for varying the pitch of said blades including a member axially movable and tiltable relative to said shaft having operative connections to said pitch varying mechanism, a first manual means for moving said member axially of said shaft to change the pitch of said blades collectively including a first pilot's control lever and linkage means connecting said lever to said member, a second manual means for tilting said member to change the pitch of said blades cyclically including a second pilot's control lever and a second linkage means connecting the latter to said member, said second linkage means including a first pivoted member having a pivoted connection to said axially movable and tiltable member and another pivotal connection to said second control lever, and compensating means interposed between said first and second linkage means for maintaining the tilted position of said tiltable member unchanged during axial movement thereof including a second pivoted member pivoted on a fixed part of said aircraft having an operative connection with said first linkage and carrying the pivotal support for said first pivoted member.

8. In a rotary wing aircraft, a drive shaft, a rotor hub on said shaft, a flapping link pivoted to said hub for movement about a generally horizontal pivot, a drag link pivoted for movement about a generally vertical pivot on said flapping link, a variable pitch blade mounted on said drag link having a horn for effecting pitch changing movements of said blade about its longitudinal axis, control means including a tiltable swash plate mechanism mounted beneath said hub and bodily movable toward and away from the latter, means for securing one portion of said mechanism to fixed structure of the aircraft against rotation relative thereto, another portion being connected to said shaft for rotation therewith, a rockable shaft having its inboard end mounted on said flapping link, said shaft having an arm adjacent one end operatively connected with said rotatable portion of said swash plate mechanism and a second arm operatively connected with said blade horn, manually operable means operatively connected with said swash plate mechanism for moving said mechanism bodily to vary the pitch of said blade, and manually operable means operatively connected with said one portion of said mechanism for tilting the latter to cyclically vary the pitch of said blade.

9. In a rotary wing aircraft, a drive shaft, a rotor hub on said shaft, a plurality of flapping links pivoted to said hub for movement about generally horizontal pivots, a drag link pivoted to each of said flapping links for movement about generally vertical pivots on said flapping links, a rotor blade mounted on each of said drag links, each having a horn for effecting pitch changing movement about its longitudinal axis, a sleeve splined to said shaft beneath said hub and slideable along said shaft; a tiltable swash plate mechanism carried by said sleeve and slideable therewith along said shaft, said swash plate mechanism including one portion rotatable with said sleeve and another portion non-rotatably secured to fixed aircraft structure, a rockable shaft journalled at its inboard and outboard ends on each of said flapping links, each having an arm operatively connected with said rotatable portion of said swash plate mechanism and a second arm connected with a blade horn, manually operable means operatively connected with said sleeve for reciprocating the same along said shaft to vary the pitch of said blades collectively, and manually operable means operatively connected with said stationary portion of said swash plate mechanism for tilting the same and varying the pitch of said blades cyclically.

10. In a rotary wing aircraft, a drive shaft, a sustaining rotor driven by said shaft having variable pitch blades pivoted thereon for movement with a plurality of degrees of freedom, control mechanism comprising a tiltable member mounted beneath said rotor and bodily movable toward and away from said rotor, one portion of said member being non-rotatably secured to fixed structure of the aircraft and another portion of said member being rotatable with said rotor, a universal pivot connection between each of said blades and said rotor including a flapping link, rockable shafts mounted upon said flapping links for rocking movement about their axes, operative connections between said rotatable portion of said member and each of said rockable shafts and between the latter and the several blades, manually operable means operatively connected with said tiltable member for bodily moving the same to collectively change the pitch of said blades, and manually operable means operably connected with the stationary portion of said tiltable member for tilting said member to cyclically vary the pitch of said blades.

11. In a rotary wing aircraft, a drive shaft, a sustaining rotor having variable pitch blades pivoted for movement with a plurality of degrees of freedom and driven by said shaft, control mechanism comprising a sleeve surrounding said shaft beneath said rotor, said shaft and sleeve having a splined connection on which said sleeve is slideable axially of said shaft, a tiltable member pivotally mounted upon said sleeve, said member having a portion rotatable with said sleeve and a second portion non-rotatably secured to fixed structure of the aircraft, a universal pivot mounting between each blade and said rotor including a flapping link, a rockable shaft mounted upon each of said flapping links, operative connections between said rotatable portion of said tiltable member and said rockable shafts and between said rockable shafts and the several blades for changing the pitch of the latter, manually operable means operatively connected with said sleeve for bodily moving said sleeve and said tiltable member to increase the pitch of said blades collectively, and manually operable means operatively connected with said non-rotatable portion of said tiltable member for tilting the latter and cyclically varying the pitch of said blades.

MICHEL D. BUIVID.
RALPH PAUL ALEX.

REFERENCES CITED

The following references are of record in the file of this patent:

UNITED STATES PATENTS

| Number | Name | Date |
|---|---|---|
| 1,887,703 | Vaughn | Nov. 15, 1932 |
| 1,934,399 | Bleecker | Nov. 7, 1933 |
| 1,990,606 | Junkers | Feb. 12, 1935 |
| 2,017,105 | Pecker | Oct. 15, 1935 |
| 2,030,578 | Flettner | Feb. 11, 1936 |
| 2,101,399 | Larsen | Dec. 7, 1937 |
| 2,177,499 | Schairer | Oct. 24, 1939 |
| 2,201,810 | Campbell | May 21, 1940 |
| 2,318,259 | Sikorsky | May 4, 1943 |
| 2,322,153 | Nardone | June 15, 1943 |
| 2,376,523 | Synnestvedt | May 22, 1945 |
| 2,380,582 | Cierva | July 31, 1945 |
| 2,383,139 | McQuire | Aug. 21, 1945 |
| 2,396,189 | Millar | Mar. 5, 1946 |
| 2,427,646 | Synnestvedt | Sept. 16, 1947 |
| 2,444,070 | Stanley | June 29, 1948 |
| 2,473,331 | Donley | June 14, 1949 |

FOREIGN PATENTS

| Number | Country | Date |
|---|---|---|
| 572,909 | Great Britain | Sept. 15, 1943 |